United States Patent [19]
Bettocchi

[11] Patent Number: 4,743,147
[45] Date of Patent: May 10, 1988

[54] AUTOMATIC LOADER FOR MACHINE TOOLS

[75] Inventor: Ettore Bettocchi, Porretta Terme, Italy

[73] Assignee: Metalcastello srl, Bologna, Italy

[21] Appl. No.: 935,411

[22] PCT Filed: Feb. 13, 1986

[86] PCT No.: PCT/EP86/00068

§ 371 Date: Oct. 28, 1986

§ 102(e) Date: Oct. 28, 1986

[87] PCT Pub. No.: WO86/05132

PCT Pub. Date: Sep. 12, 1986

[30] Foreign Application Priority Data

Feb. 28, 1985 [IT] Italy .............................. 67214 A/85

[51] Int. Cl.⁴ .............................................. B23F 23/04
[52] U.S. Cl. ................................. 409/7; 51/215 AR; 409/49; 414/744 A
[58] Field of Search ..................... 29/568; 409/6, 7, 8, 409/32, 33, 34, 36, 37, 49, 62; 51/215 AR; 414/744 A

[56] References Cited

U.S. PATENT DOCUMENTS

| | | | |
|---|---|---|---|
| 2,692,535 | 4/1948 | Praeg | 409/6 |
| 2,733,641 | 6/1951 | Praeg | 409/7 |
| 2,782,687 | 2/1957 | Carlsen et al. | 409/8 |

FOREIGN PATENT DOCUMENTS

| | | | |
|---|---|---|---|
| 1074367 | 1/1960 | Fed. Rep. of Germany | 409/7 |
| 913191 | 12/1962 | United Kingdom | 409/6 |
| 949870 | 2/1964 | United Kingdom | |

OTHER PUBLICATIONS

Scott, Metal working Production, 4/27/60, pp. 753-756.

Primary Examiner—Z. R. Bilinsky
Attorney, Agent, or Firm—Sughrue, Mion, Zinn, Macpeak & Seas

[57] ABSTRACT

The invention concerns an automatic loader for gear shaving machines. The machine utilizes a rotary cutter which meshes with the gear to be shaved. The gear is brought into a shaving position by a loader having a moveable feed member including a first slide which moves in a vertical direction and a second slide which moves in a horizontal direction. The gear to be shaved is supported by a first end of a rocker arm. The rocker arm is centrally articulated about the first slide and is connected to a gas spring at its second end. When the gear approaches the rotary cutter but fails to mesh with it the rocker arm is angularly displaced and actuates an electronic switch. The switch controls the movement of the vertical and horizontal slides and readjusts the position of the gear until it successfully meshes with the rotary cutter.

3 Claims, 3 Drawing Sheets

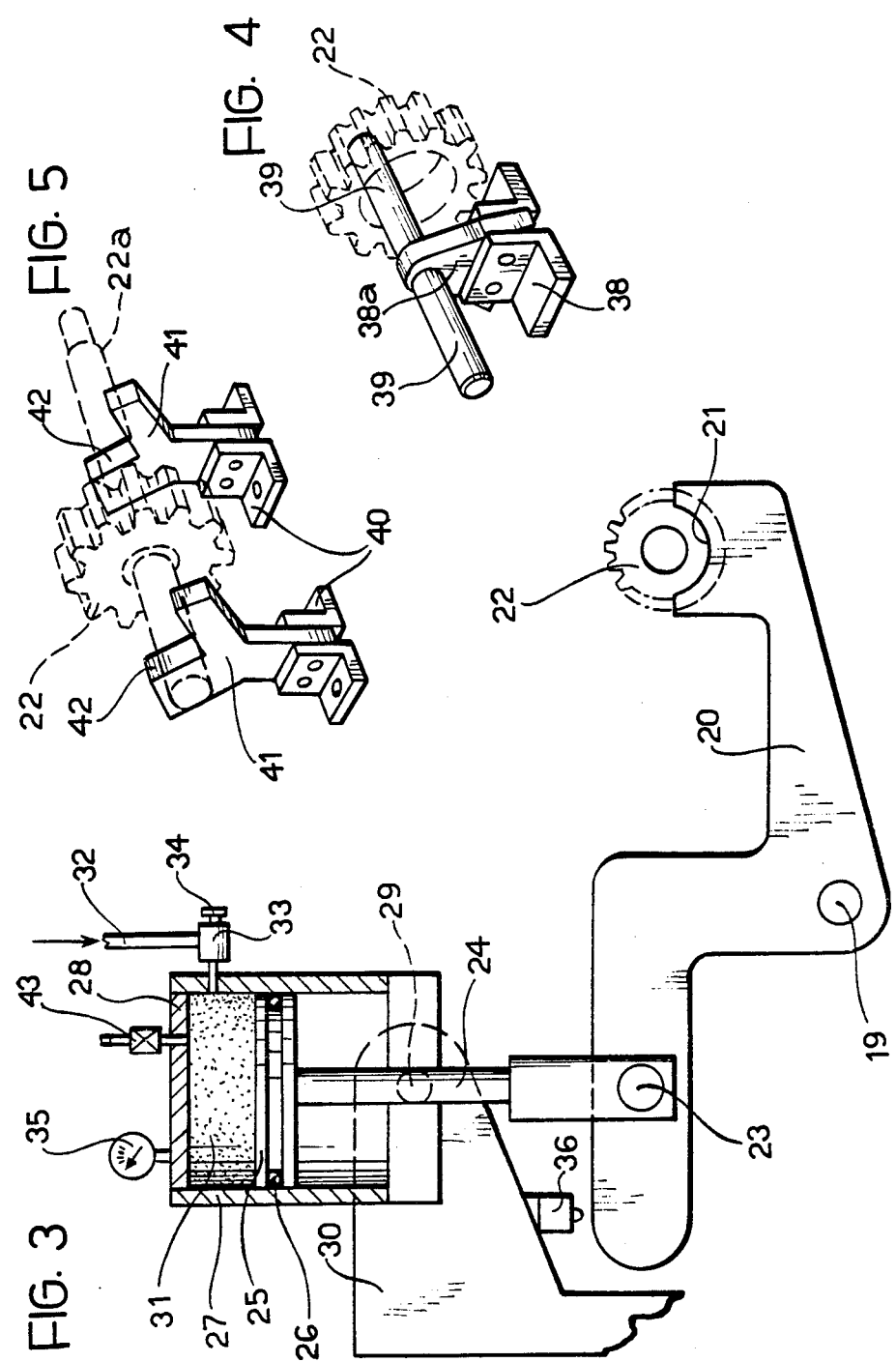

AUTOMATIC LOADER FOR MACHINE TOOLS

FIELD OF THE INVENTION

The present invention relates to an automatic loader for machine tools and particularly for gear-shaving machines.

SUMMARY OF THE INVENTION

The object of the invention is to provide a loader which is more efficient than the known loaders of the prior art and, in the particular case of application to gear-shaving machines, enables the step of meshing the gear to be shaved with the shaving cutter to be effected safely and without risk of damage to the teeth of the gear and the shaving cutter.

This object is achieved by the characteristic which constitutes the subjet of Claim 1 below.

BRIEF DESCRIPTION OF THE DRAWINGS

Further characteristics and advantages of the present invention will become apparent from the description which follows with reference to the appended drawings, provided purely by way of non-limiting example, in which:

FIG. 3 illustrates a detail of FIG. 2 on an enlarged scale, FIG. 4 is a perspective view of a detail of the conveyors illustrated in FIGS. 1 and 2, FIG. 5 is a perspective view of a variant of FIG. 4 and FIG. 6 is schematic view illustrating the step of meshing a gear to be shaved with the shaving cutter.

DETAILED DESCRIPTION OF THE INVENTION

Figure 1:
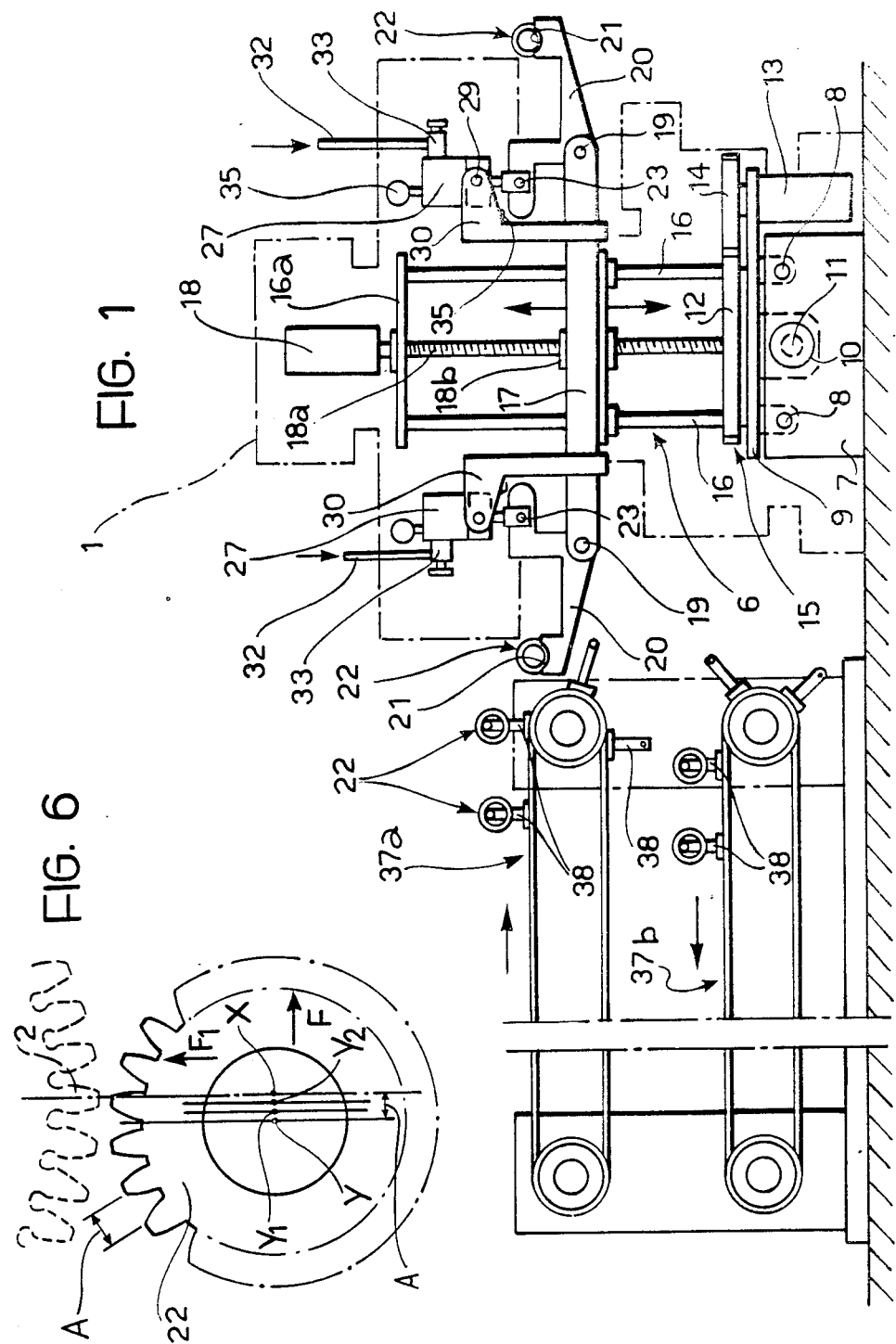
FIG. 1 is an elevational view of an automatic loader for gear-shaving machines, according to the present invention.
Figure 2:
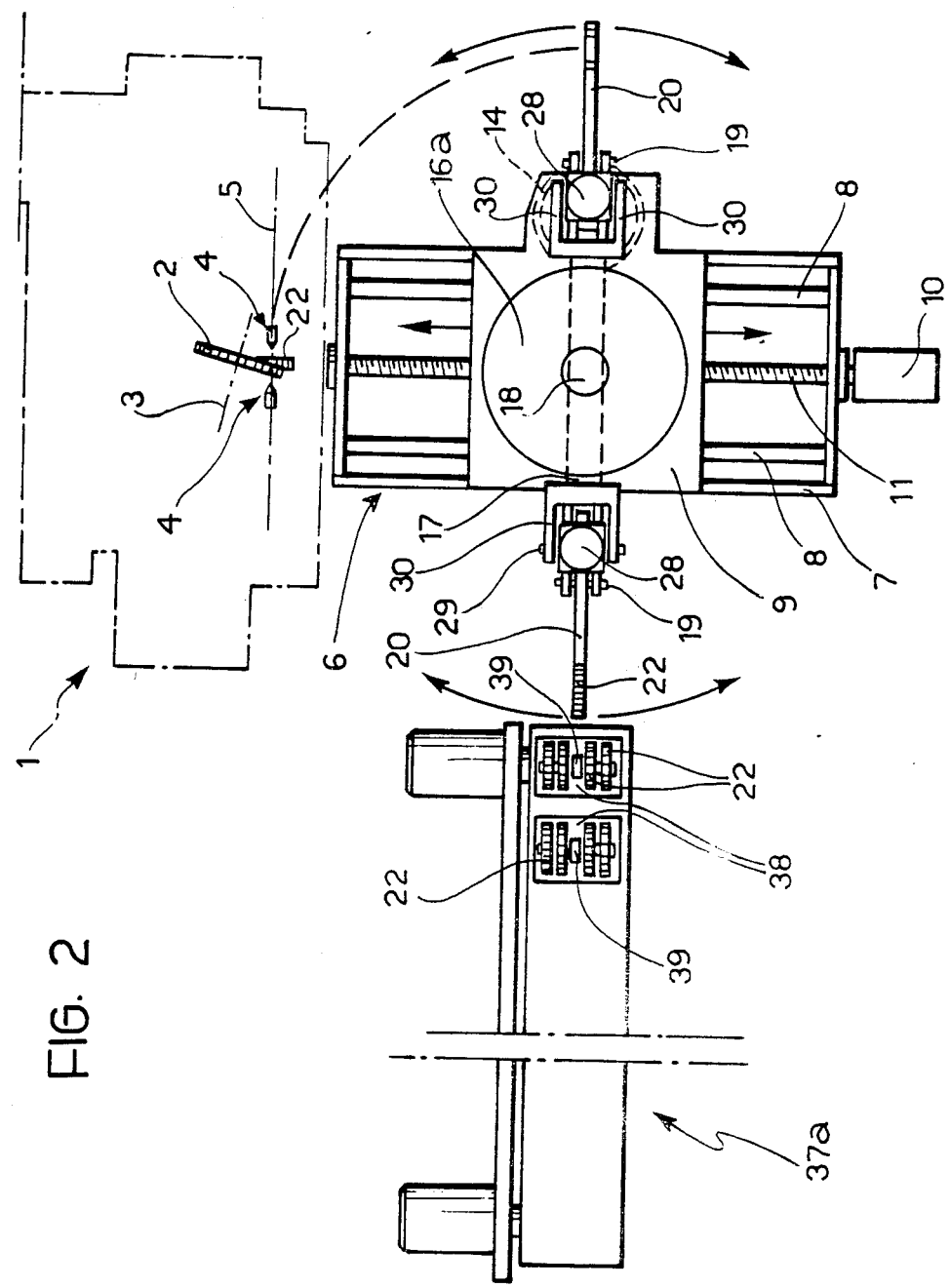
FIG. 2 is a plan view of FIG. 1.

In the example illustrated in FIGS. 1 to 4, a gear-shaving machine is indicated at 1 and has a shaving cutter 2 in the form of a toothed wheel rotated about a horizontal axis 3.

The machine 1 further includes means, generally indicated 4, for supporting a gear 22 to be shaved. The gear 22 is rotated about a horizontal axis 5 inclined to and below the axis 3, the gear 22 meshing with the teeth of the shaving cutter 2 and being pressed against the cutter as a result of an upwardly-exerted force.

A loading unit, generally indicated at 6, is adjacent the shaving machine 1 and includes a base 7 having horizontal guides 8 on which a slide 9 is slidable in a direction perpendicular to the axis 5.

The movement of the slide 9 in both directions is driven by a motor 10 which operates a screw 11 engaged with a nut, not shown, carried by the slide 9.

A circular platform 12 is rotatably mounted on the slide 9 about a vertical axis. The platform 12 is rotated by a motor 13 which drives a sprocket 14 meshing with external teeth 15 of the platform 12.

Vertical guide columns, indicated 16, are carried by the rotatable platform 12 and are connected at their upper ends by a circular plate 16a.

A support beam 17 is slidable vertically on the columns 16 and its vertical movement in both directions is driven by a motor 18 through a screw 18a which engages a nut 18b carried by the beam 17.

Each of the two ends of the support beam 17 is articulated about a horizontal pin 19 to a rocker arm 20 provided at its upper or first end with a cradle-shaped seat 21 for supporting a gear 22.

The inner or second end of each rocker arm 20 is articulated about a horizontal pin 23, as illustrated in particular in FIG. 3, to the lower end of the rod 24 of a piston 25 sealed for sliding in a cylinder 27 by means of a washer 26.

The cylinder 27 is closed at its upper end by an end wall 28 and at its lower end is articulated about a pin 29 to a forked support 30 carried by the beam 17.

The chamber 31 of the cylinder 27 between the piston 26 and the wall 28 is filled with a pressurised gas, for example air, supplied through a feed duct 32 and a pressure regulator 33 having a knob 34 for adjustment of the pressure.

A manometer for indicating the pressure in the chamber 31 is indicated 35.

The pressure in the chamber 31 is regulated by means of the regulator 33 in dependence on the weight of the gear 22 supported in the seat 21 of the rocker arm 20.

An adjustable vent valve 43 is fitted to the wall 28 of the cylinder 27. This valve could also be incorporated in the pressure regulator 33.

A microswitch 36 is carried by the forked support 30 so as to be operable as a result of a predetermined degree of oscillation of the arm 20 about the pin 19 in the clockwise sense with reference to FIG. 3.

A loading conveyor and an unloading conveyor, indicated at 37a and 37b respectively, are located above one another at the side of the loading unit 1 described above.

Each of the two conveyors 37a, 37b includes a plurality of plates 38 articulated together and each supporting, by means of a central support 38a, a transverse pin 39 which carries the gears 22.

When the gears to be shaved are already mounted on a shaft, the conveyors 37a and 37b will be provided with the supports illustrated in FIG. 5.

These supports comprise plates 40 articulated together and carrying supports 41 with V-shaped notches 42 for receiving the shaft 22a of the gear 22.

Obviously, in this case, the rocker arms 20 are also provided with pairs of supports similar to those illustrated in FIG. 5 instead of the cradle-shaped supports 21.

The operation of the automatic loader described above is as follows.

In the position illustrated in FIG. 1, the gears 22 carried by the conveyor 37a are supplied to the seat 21 of the rocker arm 20 which faces the conveyor 37a.

The other arm 20 opposite the loader 37a contains a gear 22 which has already been shaved.

As a result of a 90° rotation of the beam 17, the gear 22 to be shaved is placed beneath the shaving cutter 2 in the position illustrated in FIG. 6, in which the axis Y of the gear 22 is spaced from the working position X (corresponding to the axis indicated 5 in FIG. 2) by a distance A.

The distance A between the points Y and X corresponds essentially to the distance between the heads of two consecutive teeth of the gear 22. The motor 10 which controls the movement of the slide 9 in the direction of the arrow F is actuated, as are the other motors which control the various movements of the loading unit, by a control unit which is preferably a numerical control unit so as to make the slide 9 and hence the guide 22 effect a sequence of displacements each corresponding to a fraction of the distance A. In the embodiment illustrated, each displacement corresponds to a third of the distance A whereby the axis of the gear 22 moves in sequence into the intermediate positions indicated Y1 and Y2 before it reaches the final position, indicated X.

In each of these positions, the advance of the slide is stopped and the gear 22 is moved vertically as a result of the vertical movement of the beam 17 controlled by the motor 18.

If the teeth of the gear 22 mesh with those of the cutter 2 on the first vertical movement, the slide 9 effects a further axial movement to bring the axis of the gear into the position indicated X and the shaving is started as a result of the rotation of the shaving cutter 2.

If the teeth of the gear 22 come into head to head contact with those of the shaving cutter 2 during the upward movement of the gear 22, however, this contact causes rotation of the rocker arm 20 about its pin 19 and the consequent raising of the piston 25 in the cylinder 27 as a result of the upward movement of the beam 17. The gas in the chamber 31 is compressed until the predetermined pressure controlled by the valve 43 is reached. Thus, the contact between the heads of the teeth is cushioned by the compressed gas in the chamber 31, avoiding damage to the gear and the shaving cutter. The oscillation of the rocker arm 20 causes the closure of the microswitch 36 which stops the upward displacement of the beam 17. At this point, the numerical control unit of the machine causes the descent of the beam 17 by a predetermined distance and the subsequent movement of the slide 9, to bring the axis of the gear from the position Y to the position indicated Y1, and the cycle is repeated until meshing occurs, after which shaving starts.

The gear which has just been shaved is placed onto the unloading conveyor 37b by the loading unit as a result of the combined movements of the loading unit.

Although the above description has referred to the use of a gas spring as the means for balancing the weight of the gear and absorbing any shocks which could occur in the meshing stage, the present invention is not intended to be limited to the use of this type of spring.

In fact, hydraulic dampers or metal springs the load of which is adaptable to the weight of the gear to be shaved could be used instead of the gas spring.

I claim:

1. An automatic loader for gear shaving machines having a rotary cutter in the form of a toothed wheel rotated about a first horizontal axis and means for supporting a toothed gear to be shaved for rotation about a second horizontal axis which is situated below the first axis and is inclined to the first axis so that the gear to be shaved will mesh with and be pressed against said cutter in a working position, said loader comprising moveable feed means for raising the gear to be shaved to the working position, a rocker arm supporting said gear at a first end with said arm being pivotally secured to the feed means, and adjustable resilient means attached to said rocker arm for permitting angular displacement of said arm relative to the feed means if, as a result of the moveable member approaching the cutter, the gear fails to mesh with the cutter, characterized in that:

said moveable feed member means comprises a first slide having guide holes, a first electric motor actuating the first slide in a vertical direction, vertical guides disposed in said guide holes in said first slide, said first slide advancing the gear along the vertical guides towards the cutter, a second slide supporting said vertical guides, a second electric motor actuating said second slide along a third horizontal axis perpendicular to said second horizontal axis, the rocker arm being centrally articulated about a fourth horizontal axis to said first slide, said resilient means comprising a gas spring acting on a second end of the rocker arm and acting as a shock absorber, an adjustable pressure regulator connected to said gas spring for allowing the influx of compressed gas therein, said regulator allowing adjustment of the pressure of the gas in the gas spring independent of the weight of the gear, and an adjustable vent valve connected to said gas spring for venting the gas into the atmosphere, an electrical switch disposed on said first slide which is operable by the rocker arm as a result of a predetermined angular displacement of the rocker arm, said switch being inserted in a circuit controlling said first and second electric motors, wherein if as a result of the raising of the first slide, the teeth of the gear come into contact with the teeth of the cutter, the rocker arm is angularly displaced against the bias of the resilient means to cause closure of said electrical switch; the closure of said switch causes the stopping of the movement of the first slide towards the cutter, the lowering of said first slide, a horizontal movement of the second slide through a predetermined distance corresponding to a fraction of the distance between two consecutive teeth of the gear and a subsequent raising of the first slide until meshing of the gear and cutter is accomplished.

2. An automatic loader as claimed in claim 1 wherein said gas spring comprises a vertical cylinder which is closed at its upper end by an end wall, a support extending from said first slide and pivotally supporting said cylinder, a piston slidably disposed in said cylinder, a rod rigidly connected at one end to the piston and articulated at its other end to said second end of the rocker arm, and an upper chamber in the cylinder formed between the piston and the end wall and adapted to be connected through said adjustable pressure regulator to a source of pressurized gas and through said adjustable vent valve to the atmosphere.

3. Automatic loader as claimed in claim 1, further comprising a feed conveyor for conveying the gears to be shaved to the loader, an unloading conveyor for conveying the shaved gears from the loader unit to an unloading station, said loader unit comprising a base on which said second slide is horizontally moveable, a rotatable platform which is supported by said second slide so as to be rotatable about a vertical axis, said vertical guides being supported by said rotatable platform and guiding said first slide in a vertical direction, said first slide being shaped as a horizontal beam, said rocker arm having at said first end a seat for a gear and subject at the second end to the action of the gas spring, said beam having a rocker arm articulated at each end thereof, wherein as a result of the combined movements of the second slide relative to the base, the rotatable platform relative to the second slide and the beam relative to the vertical guides, the two rocker arms act as transfer members for transferring a gear to be shaved from the feed conveyor to the shaving machine and for transferring a shaved gear from the shaving machine to the unloading conveyor, respectively.

* * * * *